United States Patent
Yu

(10) Patent No.: US 8,908,774 B2
(45) Date of Patent: Dec. 9, 2014

(54) METHOD AND VIDEO RECEIVING SYSTEM FOR ADAPTIVELY DECODING EMBEDDED VIDEO BITSTREAM

(75) Inventor: Ya-Hui Yu, Hsinchu County (TW)

(73) Assignee: Mediatek Inc., Hsin-Chu (TW)

( * ) Notice: Subject to any disclaimer, the term of this patent is extended or adjusted under 35 U.S.C. 154(b) by 278 days.

(21) Appl. No.: 12/703,889

(22) Filed: Feb. 11, 2010

(65) Prior Publication Data

US 2011/0194619 A1    Aug. 11, 2011

(51) Int. Cl.
*H04N 7/12* (2006.01)
*H04N 19/30* (2014.01)
*H04N 19/44* (2014.01)
*H04N 19/164* (2014.01)
*H04N 19/132* (2014.01)
*H04N 19/187* (2014.01)
*H04N 19/597* (2014.01)
*H04N 19/156* (2014.01)

(52) U.S. Cl.
CPC ... *H04N 19/00424* (2013.01); *H04N 19/00533* (2013.01); *H04N 19/00236* (2013.01); *H04N 19/00127* (2013.01); *H04N 19/00321* (2013.01); *H04N 19/00769* (2013.01); *H04N 19/00206* (2013.01)
USPC .................................................. 375/240.26

(58) Field of Classification Search
USPC ........................... 375/240.01, 240.26, 240.28
IPC ...................................................... H04N 7/12
See application file for complete search history.

(56) References Cited

U.S. PATENT DOCUMENTS

| | | | |
|---|---|---|---|
| 6,292,512 B1 | 9/2001 | Radha et al. | |
| 7,016,412 B1 | 3/2006 | van Zon | |
| 2003/0231158 A1* | 12/2003 | Someya et al. | 345/101 |
| 2006/0197777 A1* | 9/2006 | Cha et al. | 345/600 |
| 2006/0256851 A1* | 11/2006 | Wang et al. | 375/240.01 |
| 2008/0013630 A1* | 1/2008 | Li et al. | 375/240.16 |
| 2008/0247460 A1 | 10/2008 | Kang et al. | |
| 2008/0250459 A1* | 10/2008 | Roman | 725/62 |
| 2009/0317005 A1 | 12/2009 | Lee et al. | |
| 2010/0080290 A1* | 4/2010 | Mehrotra | 375/240.07 |

FOREIGN PATENT DOCUMENTS

| | | |
|---|---|---|
| CN | 1981531 | 6/2007 |
| CN | 101167364 | 4/2008 |
| CN | 101507278 | 8/2009 |
| EP | 1 524 859 | 5/2005 |
| WO | WO 2005/109896 | 11/2005 |
| WO | WO 2008/060732 | 5/2008 |

OTHER PUBLICATIONS

English language translation of abstract of CN 101167364 (published Apr. 23, 2008).

* cited by examiner

*Primary Examiner* — Dave Czekaj
*Assistant Examiner* — Tracy Li
(74) *Attorney, Agent, or Firm* — McClure, Qualey & Rodack, LLP

(57) ABSTRACT

A method is provided for adaptively decoding an embedded video bitstream by a video receiving system. First, the embedded video bitstream is received. At least one terminal parameter of the video receiving system is further obtained. The at least one terminal parameter includes one of display parameter and system memory bandwidth usage of the video receiving system. Next, the embedded video bitstream is truncated to extract a truncated video bitstream according to the at least one terminal parameter. Finally, the truncated video bitstream is decoded to reconstruct video data.

22 Claims, 4 Drawing Sheets

METHOD AND VIDEO RECEIVING SYSTEM FOR ADAPTIVELY DECODING EMBEDDED VIDEO BITSTREAM

BACKGROUND

1. Field

The disclosed embodiments relate to video decoding, and more particularly relate to a video receiving system which can adaptively decode an embedded video bitstream to fit terminal parameters of a video receiving system, and method thereof.

2. Description of the Related Art

With the development of multimedia information communication technologies, demand for realizing different digital encoding and decoding formats have escalated. For example, with respect to various video transmitting and receiving systems, optimized video bitstreams corresponding to an original video content are supplied to disparate terminals or target devices, such as personal digital assistants (PDAs), cell phones, digital televisions (DTVs) or set-top boxes, along with different environments and scenarios. Multiple video streams are required to optimally fit into heterogeneous networks via different terminals or target devices with specific video content requirements. Accordingly, corresponding optimized video bitstreams are designed and encoded to be compatible with terminal parameters of diverse displaying devices, e.g., frame rates, display resolutions, display capabilities and network conditions, e.g., a wide range of transmission bandwidths, so as to accommodate simultaneous delivery of the original video content.

Although interoperability and compatibility between different types of transmitters and receivers are facilitated by use of multiple encoded video streams, the original video content needs to be encoded many times to generate separate video bitstreams with each combination of settings targeting the transmission bandwidth and the terminal parameters of the displaying device, thereby substantially degrading coding efficiency. Further, when the original video content is unavailable or incomplete, the encoded video bitstreams need to be decoded first and then re-encoded with new settings. As a result, the decoding and re-encoding processes result in increased costs, and processing inefficiencies.

Therefore, it is desired to provide a video encoding and decoding scheme which allows one single compressed video bitstream obtained from an original video content to be adaptable to different transmission bandwidths and terminal parameters of target devices, without any additional and time-consuming decoding and re-encoding processes.

BRIEF SUMMARY

An embodiment of a method for adaptively decoding an embedded video bitstream by a video receiving system includes the following steps. First, the embedded video bitstream is received. At least one terminal parameter of the video receiving system is obtained. The at least one terminal parameter comprises one of display parameter and system memory bandwidth usage of the video receiving system. Next, the embedded video bitstream is truncated to extract a truncated video bitstream according to at least one terminal parameter. Finally, the truncated video bitstream is decoded to reconstruct video data.

Further, an embodiment of a video receiving system for adaptively decoding an embedded video bitstream includes a bitstream analyzer and a video decoder. The bitstream analyzer receives the embedded video bitstream, obtains at least one terminal parameter of the video receiving system wherein the at least one terminal parameter comprises one of display parameter and system memory bandwidth usage of the video receiving system and truncates the embedded video bitstream to extract a truncated video bitstream according to at least one terminal parameter. The video decoder is coupled to the bitstream analyzer for decoding the truncated video bitstream to reconstruct video data.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
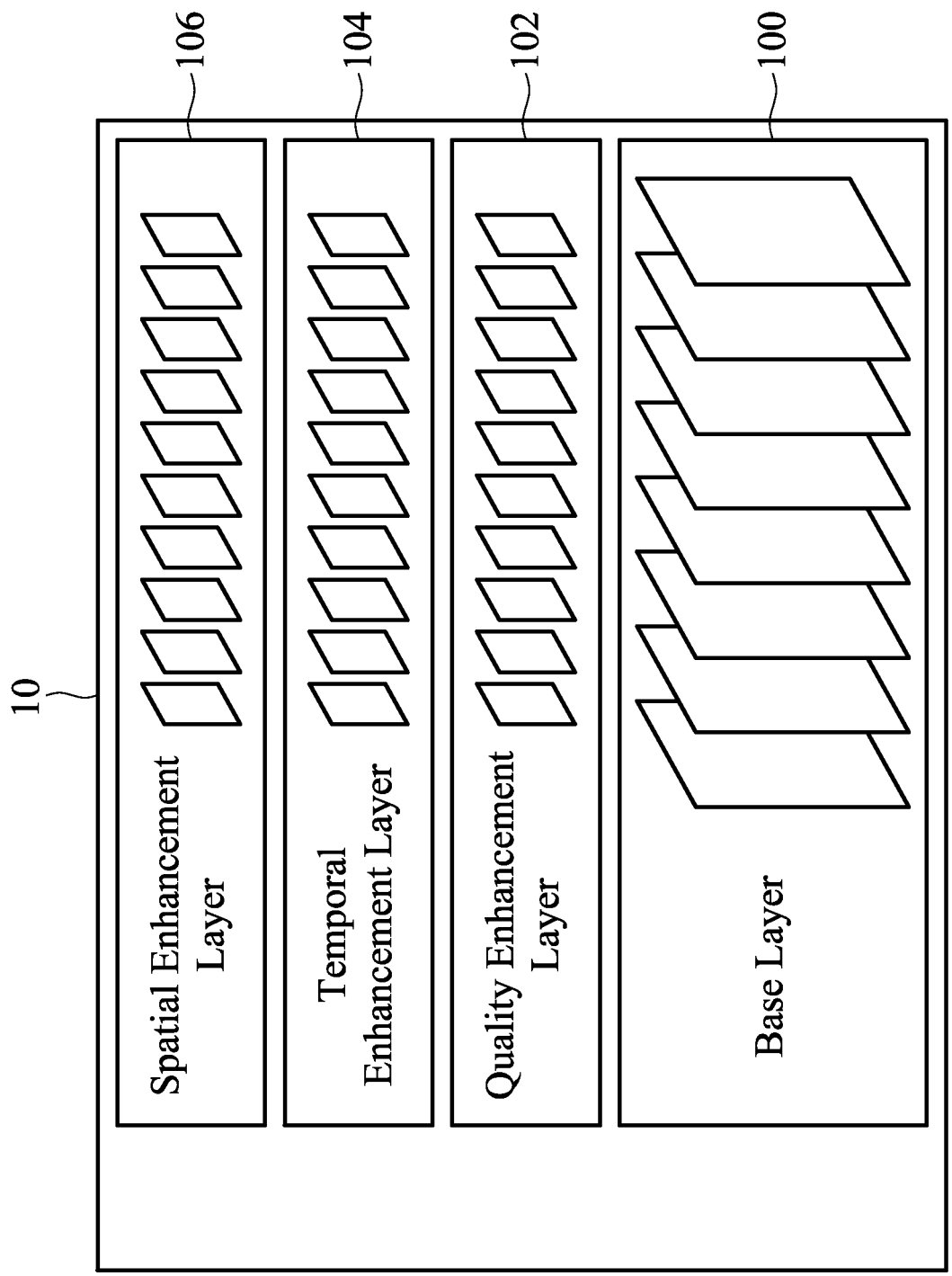
FIG. 1 is a schematic construction diagram illustrating an exemplary hierarchical structure of an embedded video bitstream according to the invention.

FIG. 1 is a schematic construction diagram illustrating an exemplary hierarchical structure of an embedded video bitstream according to the invention.

In this embodiment of FIG. 1, an original video content may be encoded into an embedded video stream such as a scalable video bitstream 10. The scalable video bitstream 10 includes a base layer 100 and several enhancement layers 102, 104 and 106 respectively supporting spatial scalability, temporal scalability and quality scalability. Specifically, the hierarchical structure defines the temporal, spatial and quality enhancement layers of the scalable video bitstream 10.

During operation, the base layer 100 contains minimum information of the scalable video bitstream 10 and represents the lowest level of detail of the original video content. Further, the scalable video bitstream 10 may be separated into one or more levels of enhancement layers. The enhancement layers 102, 104 and 106 are refinement layers for providing additional information required to reconstruct corresponding video data indicating a more reliable video representation of the original video content. That is, the more enhancement layers that are used to reconstruct the original video content, the higher the level of detail of the original video content.

Generally, several types of scalability may be used to construct the scalable video bitstream 10. For example, the scalability may comprise spatial scalability with respect to different display resolutions, temporal scalability with respect to different target frame rates, quality or fidelity scalability with respect to different signal-to-noise ratio (SNR) levels, etc. More specifically, the enhancement layers may comprise one or more spatial enhancement layers, such as the spatial enhancement layer 106, accommodating a spatial scalability corresponding to various display resolutions, e.g., 640 by 480 pixels (for VGA standard) and 800 by 600 pixels (for SVGA standard). Also, the enhancement layers may comprise one or more temporal enhancement layers, such as the temporal enhancement layer 104, accommodating a temporal scalability corresponding to various target frame rates, e.g., 30 frames per second (fps) and 60 frames per second. In addition, the enhancement layers may comprise one or more quality enhancement layers, such as the quality enhancement layer 102, accommodating a quality scalability corresponding to various signal-to-noise ratio levels, e.g., 30 dB and 40 dB. In this illustrated embodiment of FIG. 1, the scalable video bitstream 10 may reconstruct the corresponding video data according to different resolutions, different frame rates or different signal-to-noise ratio levels.

According to an embodiment, the enhancement layers may be encoded by referencing the base layer 100. In this way, in the embodiment of FIG. 1, the spatial enhancement layer 106 may be encoded by referencing the base layer 100 having the lowest display resolution, e.g., 320 by 240 pixels (for QVGA standard). Similarly, the temporal enhancement layer 104 may be encoded by referencing the base layer 100 having the lowest target frame rate, e.g., 15 frames per second. Further, the quality enhancement layer 102 in FIG. 1 may be encoded by referencing the base layer 100 having the lowest signal-to-noise ratio level, e.g., 25 dB.

According to other embodiments, by utilizing scalability, one enhancement layer, e.g., a spatial enhancement having a higher display resolution, may be encoded by only referencing another particular enhancement layer, e.g., a spatial enhancement having a relatively lower display resolution. That is, a relatively higher level enhancement layer is encoded based on a relatively lower level enhancement layer or base layer.

Figure 2:
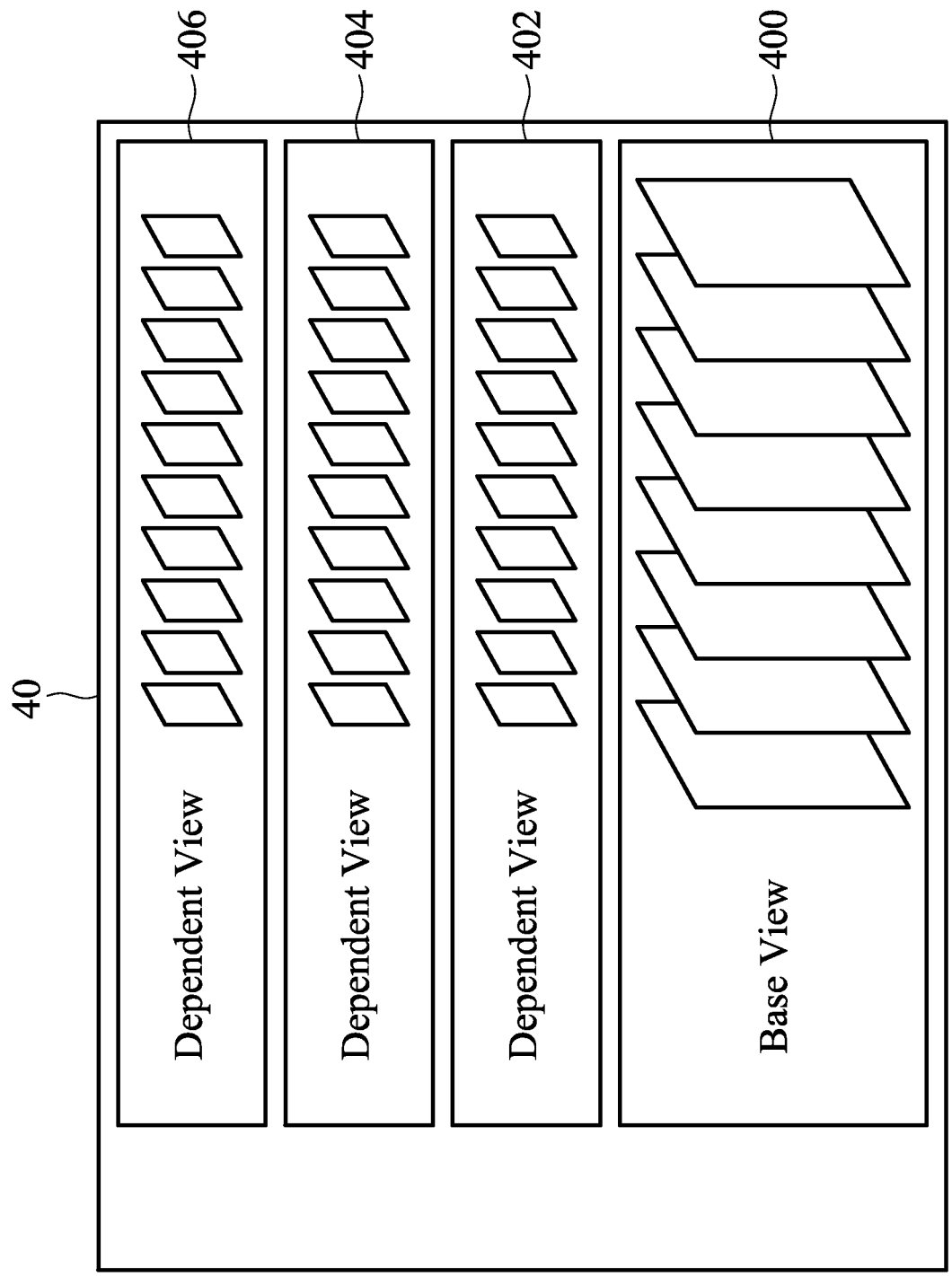
FIG. 2 is a schematic construction diagram illustrating an exemplary hierarchical structure of another embedded video bitstream according to the invention.

FIG. 2 is a schematic construction diagram illustrating an exemplary hierarchical structure of another embedded video bitstream according to the invention.

In this embodiment of FIG. 2, an original video content, such as a stereoscopic or three-dimensional (3D) video content, may be encoded into an embedded video stream such as a multi-view video bitstream 40. The multi-view video bitstream 40 includes a base view 400 and several dependent views 402, 404 and 406 corresponding to different views of a scene. During operation, the base view 400 is independently decodable for reconstructing the corresponding video data for a two-dimensional (2D) display. Further, the dependent views 402, 404 and 406 accommodating the three-dimensional perspective are encoded by referencing the base view 400 and provided for reconstructing the corresponding stereoscopic or three-dimensional video data.

Figure 3:
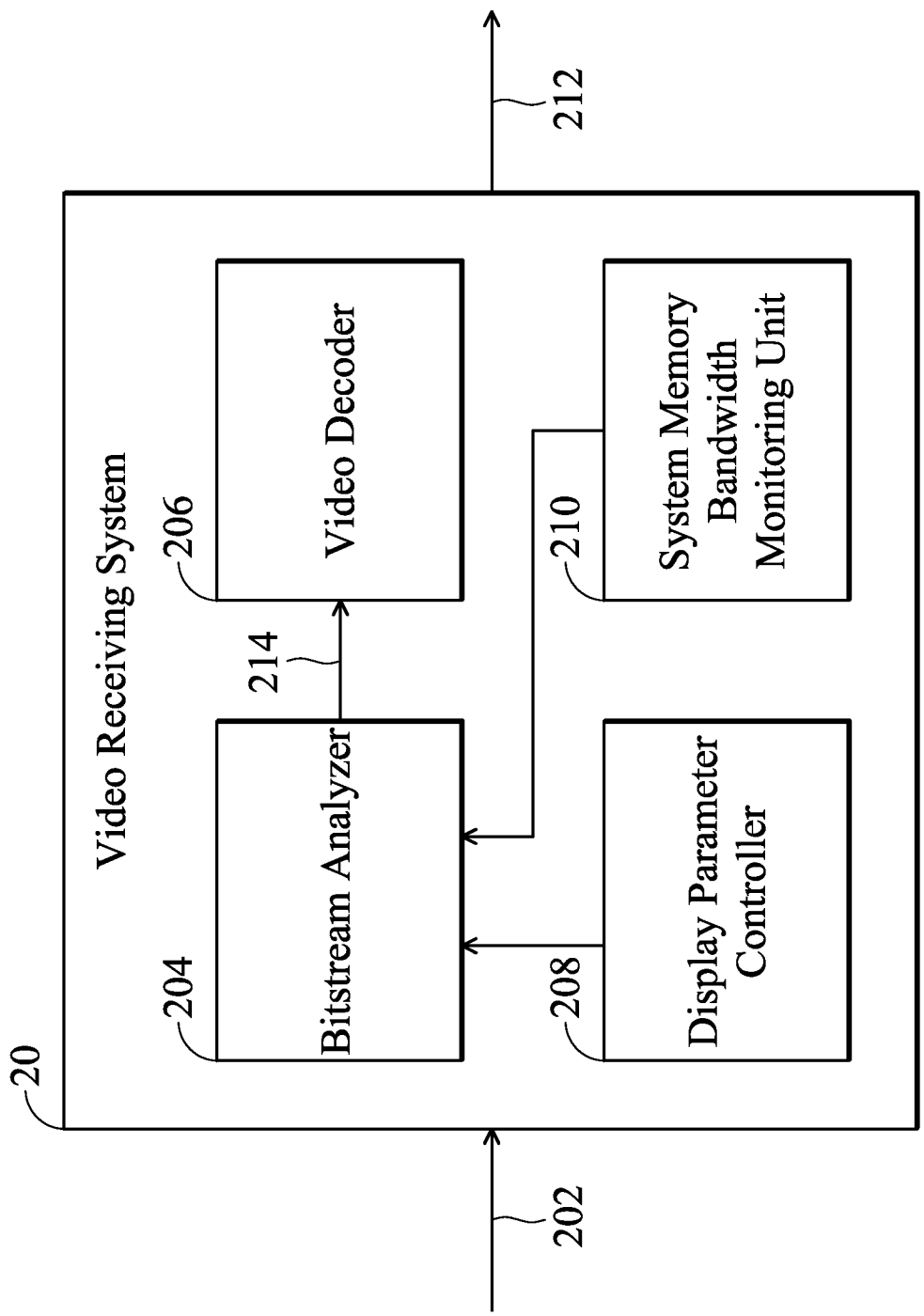
FIG. 3 is a block diagram illustrating an embodiment of a video receiving system.

FIG. 3 is a block diagram illustrating an embodiment of a video receiving system 20. The video receiving system 20 is provided for adaptively decoding an embedded video bitstream 202. The video receiving system 20 may be applied to different systems, such as a video conference system, a surveillance system, and so on. In addition, the embedded video bitstream 202 may be transmitted from the transmitter to the video receiving system 20 by use of media sources comprising broadcasting channel (such as terrestrial television broadcasting), communication networking channel (such as wireless network) and storage media (such as hard disk driver).

Referring to FIG. 3, the video receiving system 20 comprises a bitstream analyzer 204 and a video decoder 206.

During operation, the bitstream analyzer 204 receives the embedded video bitstream 202 and obtains at least one terminal parameter of the video receiving system 20. According to an embodiment, the terminal parameter includes display parameters provided from a display parameter controller 208 and/or system memory bandwidth usage derived from a system memory bandwidth monitoring unit 210. It is noted that the at least one terminal parameter may include only one display parameter from the display parameter controller 208, the system memory bandwidth usage from the system memory bandwidth monitoring unit 210, or both of them.

According to one embodiment, the video receiving system 20 is provided for adaptively decoding a scalable video bitstream which includes a base layer, such as the base layer 100 as shown in FIG. 1, and at least one enhancement layer, such as the enhancement layers 102, 104 and 106 as shown in FIG. 1. Note that the enhancement layers of the scalable video bitstream may feature at least one type of the scalability described above. The decoding process of the scalable video bitstream by the video receiving system 20 is described below in details with reference to FIGS. 1 and 3.

In the embodiment of FIG. 3, the video receiving system 20 is capable of reconstructing corresponding video data 212 in the scalable video bitstream according to at least one terminal parameter such as a display parameter supplied from the display parameter controller 208, wherein the display parameter may be a display resolution, a target frame rate, or a signal-to-noise ratio level of the video data 212. The display parameter may be determined according to a display device capability of a display unit (not shown) for displaying the video data 212 or alternatively settings by a user or viewer. For example, the display resolution may be determined according to the specification of the display unit (not shown). In addition, the display resolution may be determined according to a display screen of the display unit, such as full screen display, picture-in-picture (PIP) display, picture-out-of-picture (POP) display, which may be demanded by the user.

The operation of the video receiving system 20 is described as follows. It is assumed that the users/viewer demands a full screen display of the video data 212 outputted from the video receiving system 20 on the entire screen of the display unit, wherein the display resolution supported by the display unit is 640 by 480 pixels. It is further assumed that the scalable video bitstream includes one base layer having a display resolution of 320 by 240 pixels and several enhancement layers having two spatial enhancement layers, wherein the two spatial enhancement layers may serve multiple display resolutions, the first one is at 640 by 480 pixels and the second one is at 800 by 600 pixels. During operation, upon receiving the scalable video bitstream from the transmitter, the bitstream analyzer 204 coupled to the video decoder 206 determines whether the scalable video bitstream is required to be truncated according to at least one terminal parameter of the video receiving system 20 (e.g., display parameters such as the display resolution). According to the determined result, a truncated video bitstream 214 is then supplied to the video decoder 206. More specifically, the video decoder 206 first decodes the base layer of the scalable video bitstream and subsequently decodes the enhancement layers according to the at least one terminal parameter of the video receiving system 20. For example, in this case, since the display resolution supported by the display unit is 640 by 480 pixels and the resolution of the first spatial enhancement layer is at 640 by 480 pixels, the video decoder 206 proceeds to decode the first spatial enhancement layer by referencing the base layer. Thus, the video decoder 206 reconstructs the corresponding video data 212 to match the display resolution supported by the display unit or set by the user. Additionally, it is noted that the video decoder 206 may output the video data 212 to an internal display unit, an external display unit, or both. For example, the video data 212 may be simultaneously displayed on internal/external display windows of a folder type cell phone.

For the picture-in-picture (PIP) display or picture-out-of-picture (POP) display, the video data 212 output from the video receiving system 20 may be displayed on a smaller window overlapped on the entire screen of the display unit or displayed as two side-by-side windows on the display unit. Similarly, it is assumed that the scalable video bitstream includes the base layer having a display resolution of 320 by 240 pixels and several enhancement layers including two spatial enhancement layers. The two spatial enhancement layers serve multiple display resolutions, the first one is at 640 by 480 pixels and the second one is at 800 by 600 pixels. In addition, it is assumed that the video data 212 is determined to be displayed in one of two side-by-side picture-out-of-picture windows that divide the entire screen of the display unit into two regions of the same size, i.e., 320 by 240 pixels since the display resolution supported by the display unit is 640 by 480 pixels. In this case, the bitstream analyzer 204 truncates the scalable video bitstream to extract the truncated video bitstream 214 according to the at least one terminal parameter of the video receiving system 20 (e.g., display resolution of the picture-out-of-picture window). In this regard, the first and two spatial enhancement layers are determined to be truncated. That is, the first and two spatial enhancement layers are directly truncated or discarded. Accordingly, the video decoder 206 simply extracts the required base layer from the scalable video bitstream and decodes it without decoding the first and two spatial enhancement layers.

Note further that the display parameters may be determined according to a given scenario of the video receiving system 20. Specifically, the given scenario of the video receiving system 20 may be determined based some specific video processing operations, such as motion judder cancellation (MJC) and noise reduction (NR), being activated for the video data 212.

For example, the motion judder cancellation operation may be activated via an interface by use of a menu selectable software button displayed on the screen of the display unit or alternatively by use of a specified hardware button. In this situation, the system resources such as system memory bandwidth is significantly consumed by the MJC operation; thus terminal parameters of the video receiving system 20 may be changed in response to the specific video processing operations activated. For example, the terminal parameter, i.e., SNR level, may be adjusted from 35 dB to 32 dB. As such, the truncation process of the bitstream analyzer 204 consists of efficiently and adaptively extracting the base layer and desired quality enhancement layers to accommodate the desired SNR level, thereby improving decoding efficiency.

Note that the video processing operation handles the video data 212 frame by frame and is not limited to motion judder cancellation or noise reduction.

According to another embodiment, the video receiving system 20 is provided for adaptively decoding a multi-view video bitstream which includes a base view, such as the base view 400 as shown in FIG. 2, and at least one dependent view corresponding to different views of a scene, such as the dependent views 402, 404 and 406 as shown in FIG. 2. The decoding process of the multi-view video bitstream by the video receiving system 20 is described below in details with reference to FIGS. 2 and 3.

In this case, the video receiving system 20 is capable of reconstructing corresponding video data 212 in the multi-view video bitstream according to at least one terminal parameter such as a display parameter supplied from the display parameter controller 208 (e.g., a display type of the display unit). The display type of the display unit represents the video data 212 displayed on the display unit is two-dimensional or three-dimensional, wherein the display type can be determined according to the specification of the display unit or the desired display type demanded or requested by the users. Specifically, the display type of the display unit is determined according to whether the display unit supports the only the 2D or 3D display. Alternatively, the display type of the display unit may be determined to be 2D display when the user requests a 2D display type with a 3D display unit. For example, it is assumed that the display unit supports the display of three-dimensional video content. In this regard, upon receiving the embedded video bitstream 202 from the transmitter, i.e., the multi-view video bitstream 40 as shown in FIG. 2, the bitstream analyzer 204 determines no dependent view, such as the dependent views 402, 404 and 406 in FIG. 1, is required to be truncated or discarded. Accordingly, the video decoder 206 proceeds to fully decode the dependent views 402, 404 and 406 after decoding the base view 400. Subsequently, the corresponding video data 212 with desired stereoscopic or three-dimensional effects is then reconstructed and displayed on the display unit.

Similarly, the display type of the display unit may be alternatively determined by the user. For a situation that the display unit supports both the display of two-dimensional and three-dimensional video content, the display type of the display unit may be alternatively switched by the user. When the user deactivates the display of three-dimensional video content supported by the display unit, the video decoder 206 accordingly truncates the dependent views 402, 404 and 406 and the video decoder 206 decodes the base view 400 to reconstruct the corresponding two-dimensional video data 212.

As described previously, in addition to display parameters supplied from the display parameter controller 208, the bitstream analyzer 204 determines whether the embedded video bitstream 202 is required to be truncated according to the system memory bandwidth usage derived from the system memory bandwidth monitoring unit 210. Specifically, the system memory bandwidth monitoring unit 210 monitors and calculates the whole system memory bandwidth usage based on memory configuration, the content of the embedded video bitstream 202 and the specific video processing operations of the video receiving system 20. In detail, the optimized memory configuration may allow a sufficient memory performance level, i.e., high data transfer rate and/or low latency, thereby achieving high system memory bandwidth usage. Further, the system memory bandwidth usage is susceptible to the content of the embedded video bitstream 202. For example, decoding B-frames of the embedded video bitstream 202 may lead to a larger system memory bandwidth usage than decoding I-frames and P-frames. In addition, as discussed previously, the specific video processing operations of the video receiving system 20, such as motion judder cancellation or noise reduction, may also change the system memory bandwidth usage. During operation, when the system memory bandwidth is determined to be insufficient for fully decoding the embedded video bitstream 202, the bitstream analyzer 204 truncates the redundant or unnecessary part of the embedded video bitstream 202 according to the system memory bandwidth usage derived from the system memory bandwidth monitoring unit 210, so as to reduce the system memory bandwidth consumed or the computational requirements of the video decoder 206.

According to the above-mentioned embodiments, the video receiving system 20 allows efficient and effective adaptation of the embedded video bitstream 202. Such adaptation can reconstruct the corresponding video data 212 by directly removing one or more undesired enhancement layers or dependent views of the embedded video bitstream 202 according to the terminal parameters, thereby facilitating the decoding process to balance the reconstructed display quality and decoding efficiency for different environments and operating situations.

Figure 4:
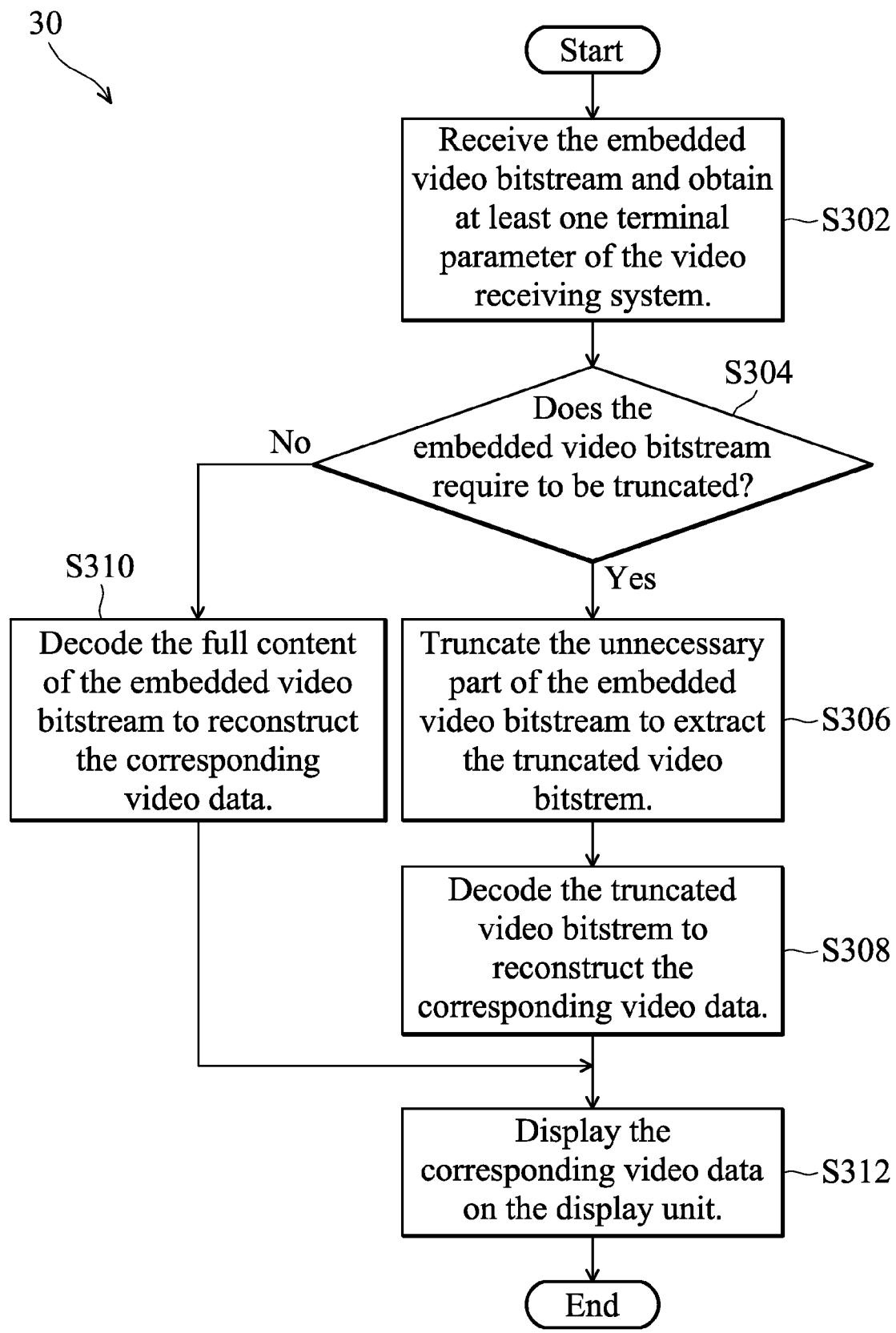
FIG. 4 is a flowchart illustrating an embodiment of a method for adaptively decoding an embedded video bitstream.

FIG. 4 is a flowchart illustrating an embodiment of a method 30 for adaptively decoding an embedded video bitstream. In an embodiment of the invention, the embedded video bitstream is a scalable video bitstream 10 which includes a base layer, e.g., the base layer 100, and at least one enhancement layer, e.g., the enhancement layers 102, 104, 106 and 108 as shown in FIG. 1. In another embodiment of the invention, the embedded video bitstream is a multi-view video bitstream 40 which includes a base view, e.g., the base view 400, and at least one dependent view, e.g., the dependent views 402, 404 and 406 as shown in FIG. 2.

Referring to FIGS. 1, 2, 3 and 4, the bitstream analyzer 204 receives the embedded video bitstream 202 and obtains at least one terminal parameter of the video receiving system 20 (step S302). The at least one terminal parameter includes display parameters supplied from the display parameter controller 208 and/or system memory bandwidth usage derived from the system memory bandwidth monitoring unit 210.

Next, the bitstream analyzer 204 truncates the received embedded video bitstream 202 according to the at least one terminal parameter. Specifically, it is determined whether the embedded video bitstream 202 requires to be truncated according to the at least one terminal parameter (step S304). Note that detailed description of determination made by the at least one terminal parameter is provided in the embodiments in FIGS. 1, 2 and 3, and is not repeated here.

When the embedded video bitstream 202 needs to be truncated based on the at least one terminal parameter, the bitstream analyzer 204 subsequently truncates the unnecessary part of the embedded video bitstream 202 to extract the truncated video bitstream 214 (step S306). In this regard, the redundant or unnecessary enhancement layers or dependent views are directly discarded without any modification to the embedded video bitstream 202. For example, with degraded terminal parameters, the bitstream analyzer 204 may truncate all the enhancement layers or the dependent views, and the video decoder 206 only decodes the base layer 100 or the base view 400. It is further noted that the terminal parameters used for truncating the embedded video bitstream 202 have been illustrated previously in the embodiments associated with FIGS. 1, 2 and 3, and hence, further description thereof is omitted for brevity.

Afterwards, the video decoder 206 decodes the truncated video bitstream 214 to reconstruct the corresponding video data 212 (step S308).

When it is determined that no enhancement layer or dependent view of the embedded video bitstream 202 needs to be truncated by the bitstream analyzer 204 with enhanced terminal parameters, the video decoder 206 then decodes the full content of the embedded video bitstream 202 to reconstruct the corresponding video data 212 (step S310).

Finally, the corresponding video data 212 is passed to the display unit for display (step S312).

The foregoing description of embodiments provides a straightforward and adaptive solution for a video receiving system to perform partial extraction and decoding on an embedded video bitstream according to terminal parameters, without additional processing of the embedded video bitstream. Thus, decompression efficiency is significantly improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for adaptively decoding an embedded video bitstream by a video receiving system, comprising:
receiving the embedded video bitstream;
obtaining at least one terminal parameter of the video receiving system wherein the at least one terminal parameter comprises one of a display parameter and system memory bandwidth usage of the video receiving system;
truncating the embedded video bitstream to extract a truncated video bitstream to accommodate the at least one terminal parameter without any modification to the embedded video bitstream, wherein truncating comprises discarding one of unnecessary enhancement layers or dependent views; and
decoding the truncated video bitstream to reconstruct video data, wherein the display parameter corresponds to a setting of a display unit coupled to the video receiving system for displaying the decoded video bitstream, and wherein the system memory bandwidth usage corresponds to at least one video processing operation activated on the video receiving system.

2. The method as claimed in claim 1, further comprising the step of:
determining whether the embedded video bitstream is required to be truncated according to the least one terminal parameter.

3. The method as claimed in claim 1, wherein the embedded video bitstream comprises a scalable video bitstream including a base layer and at least one enhancement layer.

4. The method as claimed in claim 3, wherein the display parameter is a display resolution, a target frame rate, a signal-to-noise ratio level of the video data or combination thereof.

5. The method as claimed in claim 3, wherein the at least one enhancement layer is one of a spatial enhancement layer accommodating a spatial scalability corresponding to different display resolutions, a temporal enhancement layer accommodating a temporal scalability corresponding to different target frame rates, and a quality enhancement layer accommodating a quality scalability corresponding to different signal-to-noise ratio levels.

6. The method as claimed in claim 1, further comprising the step of:
outputting the video data to the display unit for display.

7. The method as claimed in claim 6, wherein the embedded video bitstream comprises a multi-view video bitstream including a base view and at least one dependent view.

8. The method as claimed in claim 7, wherein the display parameter is a display type of the display unit.

9. The method as claimed in claim 1, wherein the at least one video processing operation is motion judder cancellation or noise reduction.

10. The method as claimed in claim 1, wherein truncating the embedded video bitstream to extract the truncated video bitstream according to the at least one terminal parameter further comprises the step of:

discarding at least one of: at least one enhancement layer and at least one dependent view in the embedded video bitstream.

11. A video receiving system for adaptively decoding an embedded video bitstream, comprising:
    a bitstream analyzer for receiving the embedded video bitstream, obtaining at least one terminal parameter of the video receiving system wherein the at least one terminal parameter comprises one of a display parameter and system memory bandwidth usage of the video receiving system, and truncating the embedded video bitstream to extract a truncated video bitstream to accommodate the at least one terminal parameter without any modification to the embedded video bitstream, wherein truncating comprises discarding one of unnecessary enhancement layers or dependent views; and
    a video decoder coupled to the bitstream analyzer for decoding the truncated video bitstream to reconstruct video data, wherein the display parameter corresponds to a setting of a display unit coupled to the video receiving system for displaying the decoded video bitstream, and wherein the system memory bandwidth usage corresponds to content of the embedded video bitstream, wherein the content corresponds to at least one of B-frames, I-frames, and P-frames.

12. The video receiving system as claimed in claim 11, wherein the bitstream analyzer further determines whether the embedded video bitstream is required to be truncated according to the least one terminal parameter.

13. The video receiving system as claimed in claim 11, wherein the embedded video bitstream comprises a scalable video bitstream including a base layer and at least one enhancement layer.

14. The video receiving system as claimed in claim 13, wherein the display parameter is a display resolution, a target frame rate, a signal-to-noise ratio level of the video data or combination thereof.

15. The video receiving system as claimed in claim 13, wherein the at least one enhancement layer is one of a spatial enhancement layer accommodating a spatial scalability corresponding to different display resolutions, a temporal enhancement layer accommodating a temporal scalability corresponding to different target frame rates, and a quality enhancement layer accommodating a quality scalability corresponding to different signal-to-noise ratio levels.

16. The video receiving system as claimed in claim 11, wherein the video decoder further outputs the video data to the display unit for display.

17. The video receiving system as claimed in claim 16, wherein the embedded video bitstream comprises a multi-view video bitstream including a base view and at least one dependent view.

18. The video receiving system as claimed in claim 17, wherein the display parameter is a display type of the display unit.

19. The video receiving system as claimed in claim 11, wherein the display parameter is determined based on at least one video processing operation being activated for the video data.

20. The video receiving system as claimed in claim 19, wherein the at least one video processing operation is motion judder cancellation or noise reduction.

21. The video receiving system as claimed in claim 11, further comprising:
    a display parameter controller coupled to the bitstream analyzer for providing the display parameter; and
    a system memory bandwidth monitoring unit coupled to the bitstream analyzer for deriving the system memory bandwidth usage.

22. A method for adaptively decoding an embedded video bitstream by a video receiving system, comprising:
    receiving the embedded video bitstream;
    obtaining at least one terminal parameter of the video receiving system wherein the at least one terminal parameter comprises one of a user-specified display parameter and system memory bandwidth usage of the video receiving system;
    truncating the embedded video bitstream to extract a truncated video bitstream to accommodate the at least one terminal parameter without any modification to the embedded video bitstream, wherein truncating comprises discarding one of unnecessary enhancement layers or dependent views; and
    decoding the truncated video bitstream to reconstruct video data, wherein the user-specified display parameter corresponds to a viewing preference for viewing the decoded video bitstream on a display unit, and wherein the system memory bandwidth usage corresponds to at least one video processing operation activated on the video receiving system.

* * * * *